Patented Apr. 30, 1929.

1,710,764

UNITED STATES PATENT OFFICE.

SOLOMON CAPLAN, OF BROOKLYN, NEW YORK, ASSIGNOR TO COMBUSTION UTILITIES CORPORATION, OF NEW YORK, N. Y., A CORPORATION OF MAINE.

PURIFICATION OF TAR-ACID-BEARING OILS.

No Drawing.  Application filed September 29, 1924. Serial No. 740,625.

The present invention relates to the purification of tar-acid-bearing oils, and more particularly to a process for eliminating color producing compounds from tar-acid-bearing oils containing them.

Some tar-acid-bearing oils, (such as low-temperature tars, blast-furnace tars, vertical retort tars, shale oils and other liquid condensates resulting from the distillation of bituminous material under carbonizing conditions mild enough to preserve the liquid by-products in a substantially primary and undecomposed form), contain certain impurities which render them unsatisfactory or make them undesirable for certain uses. One form in which these impurities manifest themselves is in the production of colored compounds when such oils are used for the manufacture of disinfectants, animal dips, saponified cresol or tar acid solutions and related products. After an exhaustive and thorough investigation of the chemical composition and properties of these colored compounds their origin has been traced to certain strongly reducing polyhydroxy compounds of which catechol, or 1-2 dihydroxy benzene may be cited as similar in constitution.

The primary object of the present invention is to provide a process for removing color producing compounds from tar-acid-bearing oils containing them.

Heretofore in preparing and refining tar-acid-bearing oils of the class described for use in the manufacture of disinfectants, animal dips and similar products, the oils have been treated to fractionation, to washings with sulfuric acid, to treatment with sulfur dioxide or to distillation over lime or caustic soda to remove color-producing impurities and to prevent color formation. All of these methods for purifying the oil by removal of color-producing impurities or prevention of color formation have not been entirely satisfactory, either because they are expensive or else because the high boiling residue eliminated from the oil by the treatment contains a large proportion of high boiling monohydroxy tar acids in addition to the polyhydroxy compounds, and as these high boiling monohydroxy tar acids are the most valuable germicides present in the oils their elimination greatly reduces the disinfectant value of the product. Another objection to most of the methods in use at present is that a redistillation of the oil is required which is costly and wasteful.

Another object of the present invention is to provide a process by which the color-producing bodies present in such tar-acid-bearing oils can be cheaply and completely extracted without also removing the valuable tar acids.

The substances producing the pink color in disinfectant emulsions prepared from such tar-acid-bearing oils are closely related to catechol and other dihydroxy phenols, and while they are hydroxy derivatives they are more acidic, more soluble in water, and more readily oxidized than are the monohydroxy tar acids. Attempts were made to employ caustic soda and other strong alkalies for removing these more acid components from the oils but this treatment has proven unsatisfactory. The caustic alkalies even in weak solution act as catalyzers for oxidation reactions wherein the color-producing compounds react with oxygen from the air to yield pink to red oxidation products. The more alkaline the solution the more pronounced are these reactions. The pink and red reaction products are less acidic than the original color-producing bodies and accordingly dissolve less readily in the alkali. As a result, the selective action of the caustic on these compounds is far from sharp, a great number of washings are required, and a considerable percentage of valuable tar acids are sacrificed before the balance of the oil is completely freed of the color-producing compounds. All caustic alkalies are stable and highly ionized in solution, and when they are used as extraction agents it is impossible to maintain weakly alkaline concentrations such as are necessary for the selective removal of the polyhydroxy compounds without loss of monohydroxy tar acids, because the caustic alkali is incapable of renewing the supply of hydroxyl ions as it is exhausted.

Accordingly another object of the present invention is to provide a process for selectively separating color-producing bodies from tar-acid-bearing oils without substantial loss of monohydroxy tar acids and without harmful secondary reactions.

With these and other objects in view the invention consists in the process for purifying tar-acid-containing oils hereinafter described and particularly defined in the claims.

Essentially the process forming the subject of the present invention in its preferred form consists in extracting tar-acid-bearing oils with weakly alkaline "buffer" agents, i. e., dilute aqueous solutions of weak alkalies such as ammonium hydroxide, calcium hydroxide (milk of lime), sodium carbonate and similar compounds. These "buffer" agents have been found to exert a strongly preferential or selective solvent action on the color-producing compounds which are present in tar-acid-bearing oils such as shale oil or tars recovered by the distillation of bituminous material under low temperature carbonizing conditions. It has been found that by employing these "buffer" agents the catalytic conditions which give rise to the oxidation of the color-producing compounds with the oxygen of the air during the process of extraction are prevented or inhibited, and a favorable coefficient of partition of the polyhydroxy compounds between the alkaline solvent and the residual tar-acid-bearing oil is preserved. Thus as a result of hydrolysis in the case of sodium carbonate, low solubility in the case of milk of lime, or instability in the case of ammonia, these "buffer" agents are all capable of maintaining a constant low alkalinity in the extract that is not only unfavorable to the catalysis of the secondary oxidation reactions but also prevents the solution of valuable monohydroxy tar acids of high germicidal value.

Dilute ammonia solution has been found to give the best results as a selective extraction agent for treating tar-acid-bearing oils containing color-producing constituents, although calcium hydroxide and sodium carbonate are only slightly less effective. It has been found that for oils containing twenty percent to thirty percent valuable tar acid bodies and less than one percent undesirable color-producing compounds of the nature described, satisfactory selective extraction of the color-producing compounds is obtained when one and one-half volumes of a one percent ammonia solution are agitated for ten minutes with one volume of the oil, the temperature being preferably raised in the meantime to about fifty degrees centigrade to facilitate subsequent separation of the layers. After the aqueous layer is drawn off one and one-half volumes of water are preferably added to the residual oil, which is then agitated, heated to fifty degrees centigrade, settled and separated as before. A second similar water washing is usually necessary to remove the last traces of alkali salts and polyhydroxy compounds. The extraction is equally effective at room temperatures, but it has been found that the stratification of the oil and aqueous layers is more rapid and sharp at higher temperatures, and accordingly, temperatures in the neighborhood of fifty degrees centigrade are preferred for efficient operation. The oil may be distilled either before or after the treatment if desired, although such distillation is not necessary for the removal of the pink color.

Water alone may be employed as the selective solvent for eliminating the polyhydroxy compounds from similar tar-acid-bearing oils. While the preferential selective action of the weakly alkaline "buffer" agents depends for its effectiveness on the marked difference in acidity between the polyhydroxy or color-forming tar acids and the monohydroxy or non-color-forming tar acids, the selective solvent action of water depends not on difference in acidity but on the marked increase in water solubility of the polyhydroxy tar acids over monohydroxy tar acids. Since water is neutral there is practically no tendency toward oxidation of the polyhydroxy tar acids, but as there is also a diminished solvent action upon them and accordingly a greater loss of the valuable tar acids, it follows that the use of either water or dilute ammonia solution will be determined in any case by comparing the extra cost of the ammonia required by the one method with the value of the tar acids lost in and the greater expenditure for extraction tanks for the other.

It is not intended to limit the scope of the present invention to the treatment of oils containing definite percentages of color-forming and non-color-forming compounds, nor to the use of definite proportions of extraction agent, nor to the employment of particular temperatures. The process is applicable to a mixture of tar acids alone, and satisfactory results are obtained by using widely variable proportions of extraction agent at normal atmospheric temperatures.

While the treatment of tar-acid-bearing oils of the class described with weakly alkaline "buffer" agents is preferably followed by one and sometimes two washings with water in order to remove traces of alkali salts and polyhydroxy compounds, these water washings are not absolutely necessary except where residual oils of extreme purity are desired. When the extraction with such a weakly alkaline "buffer" agent is followed by one or two such water washings, the volume of water required to completely purify the residual oils is small compared to the volume required when water alone is used for removing polyhydroxy compounds and other water soluble impurities from the oil. The volume of wash water used is preferably limited to that required for removing the impurities, and accordingly the loss of valuable monohydroxy tar acids from the residual oil by solution in the wash water is relatively small.

By employing the process forming the subject matter of the present invention for the purification of tar-acid-bearing oils, disinfectant emulsions can be prepared from soap base blends of the treated oil which will not turn pink, and the purification of the oils can be completed at a relatively small expense and without materially lowering the germicidal value of disinfectants prepared therefrom.

The term "tar-acid-bearing oils" is used in the description and claims to describe shale oil, low temperature coal tars, vertical retort tars and similar liquid condensates resulting from the distillation of bituminous material at low temperatures and under carbonizing conditions mild enough to preserve the liquid by-products in a substantially primary and unchanged form. The tar acid content of such oils is often characterized by the absence of more than traces of phenol, the cresols and their homologues, and is made up almost entirely of compounds which, while they resemble phenols in some of their properties, do not come within the generally accepted definition of a phenol but are rather hydroxyl derivatives of cyclic hydrocarbons which are non-aromatic in character, having hydrogen and alky side chains attached to the nucleus.

The term "'buffer' agents" is used in the claims to describe weakly alkaline compounds capable of selectively extracting polyhydroxy compounds from tar-acid-bearing oils containing them, and which as a result of hydrolysis, low water-solubility, or instability in solution are capable of supplying hydroxyl ions to their aqueous solutions as these ions are exhausted and of thus maintaining a state of alkalinity particularly favorable to the selective solution of the polyhydroxy compounds and unfavorable both to the solution of valuable monohydroxy tar acids and to catalysis of secondary oxidation reactions between the polyhydroxy compounds and oxygen of the air.

The preferred form of the invention having been thus described what is claimed as new is:

1. A method of removing color-producing impurities from tar-acid-bearing oils which comprises extracting the oils with a solution of a "buffer" agent, and separating the extract from the residual tar-acid-bearing oil.

2. A method of eliminating color-producing compounds from tar-acid-bearing oils containing them which comprises agitating the oil with a dilute solution of a "buffer" agent, and separating the solution of alkaline salts of the color-producing compounds from the residual tar-acid-bearing oil.

3. A method of removing color-producing impurities from tar-acid-bearing oils which comprises agitating one volume of the oil with from one to two volumes of an approximately 1% solution of a "buffer" agent, suspending agitation, and separating the aqueous solution of alkaline salts from the purified residual tar-acid-bearing oil.

4. A method of removing color-producing impurities from tar-acid-bearing oils which comprises agitating the oil with an aqueous solution of a weak alkali, settling, separating the water layer from the oil, and subjecting the residual oil to washings with water.

5. The method of removing color-producing impurities from tar-acid-bearing oils which comprises agitating the oil with an excess volume of diulte aqueous solution of a weakly alkaline substance, applying heat to the mixture during agitation, subsequently suspending agitation, settling, separating the water layer from the residual oil, and subjecting the residual oils to washings with water.

6. A method of removing color-producing impurities from tar-acid-bearing oils which comprises agitating one volume of the oil with about one and one-half volumes of a one percent aqueous ammonia solution for a period of about ten minutes at a temperature of about 50° C., subsequently settling and separating the aqueous layer from the residual oil, agitating the residual oil with about one and one-half volumes of water at a temperature of about 50° C., settling and separating the aqueous layer from the purified oil.

7. A method of preparing tar-acid-bearing oils for use as disinfectants which comprises agitating the oil with a dilute solution of a "buffer" agent to remove color-producing compounds and subsequently washing the residual oil with water to remove traces of alkali salts and any remaining color-producing compounds.

In testimony whereof I affix my signature.

SOLOMON CAPLAN.